C. BOSTEL.
STEERING MECHANISM FOR FLYING MACHINES.
APPLICATION FILED MAY 1, 1909.
974,229.
Patented Nov. 1, 1910.
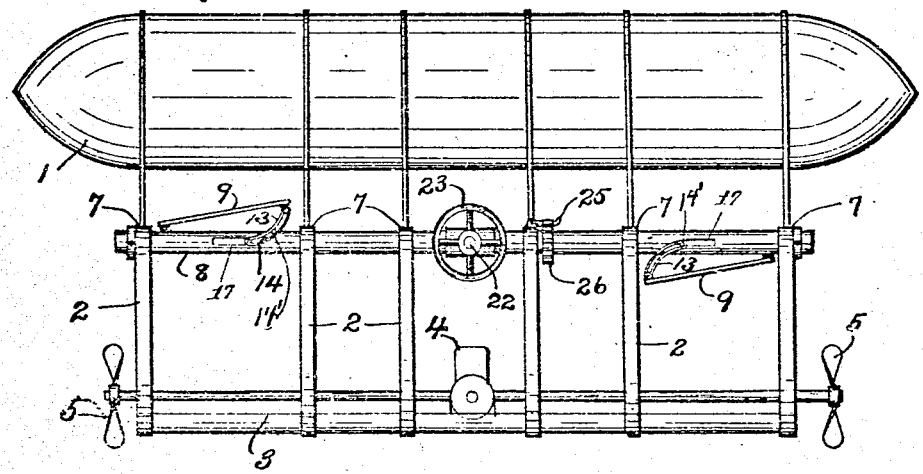
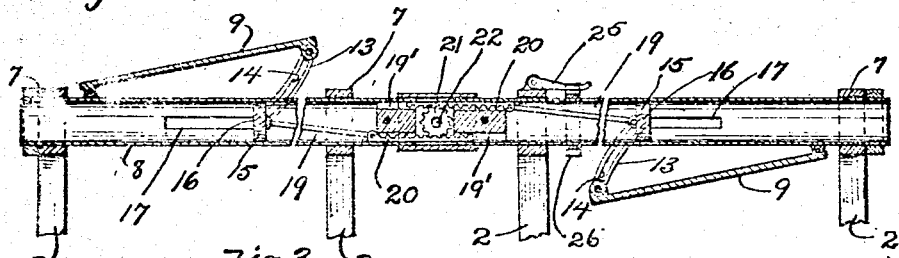
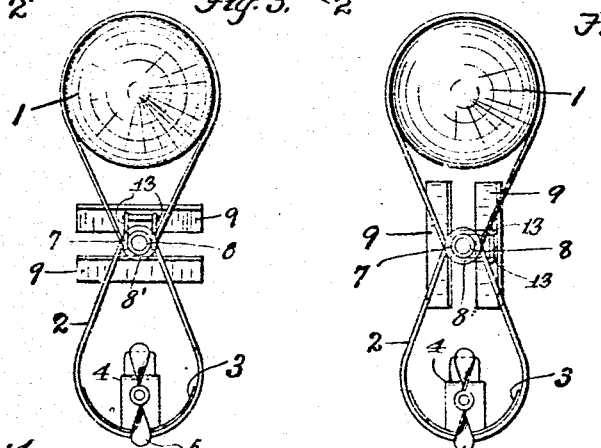
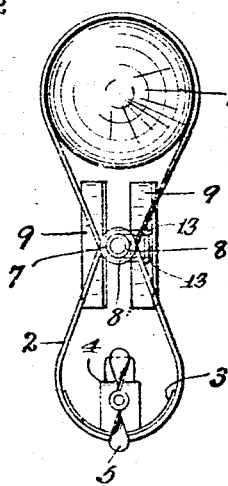
Witnesses:
H.J. Gittins.
H.L. McDonnell.
Inventor:
Carl Bostel
by Lynch & Low
Attorneys.

UNITED STATES PATENT OFFICE.

CARL BOSTEL, OF CLEVELAND, OHIO.

STEERING MECHANISM FOR FLYING-MACHINES.

974,229.  Specification of Letters Patent.  Patented Nov. 1, 1910.

Application filed May 1, 1909. Serial No. 493,242.

*To all whom it may concern:*

Be it known that I, CARL BOSTEL, a citizen of the United States of America, residing at Cleveland, in the county of Cuyahoga and State of Ohio, have invented certain new and useful Improvements in Steering Mechanism for Flying-Machines; and I hereby declare the following to be a full, clear, and exact description of the invention, such as will enable others skilled in the art to which it pertains to make and use the same.

This invention relates to new and useful improvements in steering mechanism for flying machines.

The object of this invention is to provide mechanism of this description by means of which the course of the machine can be readily directed either for ascending or descending or for changing the course when moving in a horizontal plane.

With these objects in view my invention consists in the features of construction and combination of parts, described in the specification, pointed out in the claims and illustrated in the accompanying drawings.

In the accompanying drawings Figure 1 is a side elevation of a flying machine provided with my improved steering mechanism. Fig. 2 is an enlarged central section through the steering mechanism with the guide planes thereof arranged as in Fig. 1. Fig. 3 is an end view of Fig. 1. Fig. 4 is a view similar to Fig. 3 showing the guide planes in position for changing the course of the machine while traveling in a horizontal plane.

Heretofore one of the most serious obstacles in aerial navigation has been inability to maintain the machine in an approximately horizontal position while ascending or descending or even when attempting to move in a horizontal plane. The failure to maintain this horizontal position prevents the proper working of the engine which consequently impedes the movement of the machine. By my invention I so arrange the guide planes of the steering mechanism that they will maintain the machine at all times in a horizontal position whether ascending or descending thereby securing the perfect working of the engine and enabling the operator to have complete control of the machine at all times.

Again referring to the drawings 1 represents the balloon from which is hung in any suitable manner a frame work 2 which is provided with a platform 3. This platform serves to support the driving engine 4 which is provided with a suitable propeller 5. In suitable bearings 7 is mounted a hollow shaft 8 so that it is free to rotate in the said bearings 7. The shaft 8 extends beyond the bearings at each end and on the ends thereof are rigidly secured collars 8', which prevent the longitudinal shifting of said shaft 8. At each end of the shaft 8 and on diametrically opposite sides thereof are arranged the steering blades 9. Each blade is pivotally secured at one end to the shaft so that the blades can be swung toward or away from the shaft and the angle of the blades can therefore be changed as desired. To the free end of each of the blades 9 is pivotally secured a pair of curved arms 13, and in each arm 13 is formed a slot 14. On each side of the shaft 9 are arranged pins 14' which extend into the slots 14 in the curved arms 13. In the hollow shaft 8 are arranged slidable blocks 15 which are provided with lugs or projections 16 which extend through slots 17 formed in the said shaft and the said projections 16 form pivotal connections between the curved arms 13 and the said blocks 15. To each of the blocks 15 are secured rods 19, the free ends of which are arranged to slide in guideways 19' formed on diametrically opposite sides of the inner surface of the shaft 8 and the ends of said rods 9 are provided with rack teeth 20. A gear wheel 21 is rigidly mounted on a shaft 22 within the said shaft 8 so as to mesh with the rack teeth 20 on the ends of the said rods 19. The shaft 22 is provided with a hand wheel 23. It will therefore be seen that by turning the hand wheel in one direction the rods 19 will be drawn in toward the center of the shaft and the angle of the planes 9 to the shaft 8 will thereby be increased and by turning the hand wheel in the other direction the planes will be drawn down toward the shaft so as to decrease the angle of said planes to the shaft. It is therefore possible to operate both planes simultaneously and keep them at the same relative angle to the shaft 8. On one of the stationary supports of the shaft 8 is mounted a latch 25 and on the shaft 8 in proximity to said latch are formed a series of projections or teeth 26 with which the said latch 25 is adapted to engage so as to lock the said shaft 8 against rotation. Now if it is desired to change the course in which the machine is moving the latch 25 is loosened and the shaft 3 is rotated, preferably through a quarter of a revolution, either to the right hand or to the left hand according to the direction in which the machine is to move, and the steering planes 9 will then be turned from their horizontal position to a vertical position, but will still be controlled by the hand wheel in the manner before described.

What I claim is,—

1. In steering mechanism for flying machines, the combination of a frame, a shaft rotatably mounted in said frame, steering planes hinged at each end of said shaft, arms pivotally secured to the free ends of said planes, sliding blocks arranged within said shaft, means connecting said arms and said blocks, bars connected to said blocks and provided at their free ends with racks, a gear wheel mounted in said shaft and adapted to mesh with said racks on said rods and means for rotating said gear wheel, for the purpose set forth.

2. In steering mechanism for flying machines, the combination of a frame, a shaft rotatably mounted in said frame, steering planes hinged at each end of said shaft, said planes being arranged on diametrically opposite sides of said shaft, means for rotating said shaft so as to change said planes from a horizontal to a vertical position and means for simultaneously changing the angle of said planes relative to said shaft, said means comprising curved arms pivotally secured to the free ends of said planes, sliding blocks arranged within said shaft, means connecting said arms and said blocks, bars connected to said blocks and provided at their free ends with racks, a gear wheel mounted in said shaft and adapted to mesh with said racks on said rods, means for rotating said gear wheel and guide pins arranged on said shaft and adapted to engage the said curved arms, substantially as described.

3. In steering mechanism for flying machines, the combination of a frame, a shaft rotatably mounted in said frame, steering planes hinged at each end of said shaft, said planes being arranged on diametrically opposite sides of said shaft, means for rotating said shaft so as to change said steering planes from a horizontal to a vertical position, means for locking said shaft against rotation, arms pivotally secured to the free ends of said planes, sliding blocks arranged within said shaft, means connecting said arms and said blocks, bars connected to said blocks and provided at their free ends with rack teeth, a gear wheel mounted in said shaft and adapted to mesh with said rack teeth on said rods and means for rotating said gear wheel, for the purpose set forth.

In testimony whereof, I sign the foregoing specification, in the presence of two witnesses.

CARL BOSTEL.

Witnesses:
VICTOR C. LYNCH,
N. L. McDONNELL.